United States Patent [19]

Storm

[11] Patent Number: 5,390,171
[45] Date of Patent: Feb. 14, 1995

[54] SWITCHING SYSTEM

[75] Inventor: Juergen Storm, Puchheim, Germany

[73] Assignee: Siemens Aktiengesellschaft, Munich, Germany

[21] Appl. No.: 880,896

[22] Filed: May 8, 1992

[30] Foreign Application Priority Data

May 8, 1991 [EP] European Pat. Off. ............ 91107515

[51] Int. Cl.⁶ ............................................. H04Q 11/04
[52] U.S. Cl. ................................. 370/58.2; 370/58.1
[58] Field of Search ................... 370/58.2, 110.1, 68.1, 370/60, 60.1, 94.1, 58.1, 58.3; 379/230, 269, 225, 231, 234, 265, 278, 284

[56] References Cited

U.S. PATENT DOCUMENTS

| | | | |
|---|---|---|---|
| 3,859,470 | 1/1975 | Dittrich | 379/277 |
| 4,356,563 | 10/1982 | Viale | 370/58.1 |
| 4,694,452 | 9/1987 | Beckinger et al. | 370/110.1 |
| 4,761,779 | 8/1988 | Nanu et al. | 370/58.2 |
| 4,821,256 | 4/1989 | Schmidt et al. | 370/58.2 |
| 4,893,301 | 1/1990 | Andrew et al. | 370/58.2 |
| 4,905,222 | 2/1990 | Seeger et al. | 370/58.1 |
| 4,993,017 | 2/1991 | Buchinger et al. | 370/58.2 |
| 5,051,982 | 9/1991 | Brown et al. | 370/58.2 |
| 5,067,123 | 11/1991 | Hyodo et al. | 370/58.2 |

FOREIGN PATENT DOCUMENTS 0016426 10/1980 European Pat. Off. ...... H04Q 11/04
WO84/00267 1/1984 WIPO ........................ H04L 11/20

*Primary Examiner*—Douglas W. Olms
*Assistant Examiner*—Ajit Patel
*Attorney, Agent, or Firm*—Hill, Steadman & Simpson

[57] ABSTRACT

As a result of the greatly different bit rates per connection in broad band switching systems, the control capacity required per broad band connection can fluctuate by more than three orders of magnitude. In order to achieve a uniform load distribution between the group processors in view of this fluctuating need for control capacity, the allocation of the line or trunk modules to the group processors is made variable during the operation of the switching system.

5 Claims, 2 Drawing Sheets

SWITCHING SYSTEM

BACKGROUND OF THE INVENTION

In electronically controlled switching systems, a defined number of subscriber lines or trunks are often combined into a group and are controlled by what is referred to as a group processor. The required group processor performance is roughly proportional to the number of subscriber lines or trunks and can be calculated from empirical values (for example, number of call attempts per time unit and subscribers).

There is no longer any fixed relationship between the number of terminals and the group processor performance required for that purpose in broad band switching systems, particularly ATM switching systems having greatly different bit rates per connection. For example, only one broad band connection per hour could be set up via a 155 Mbit/s subscriber line, but thousands of speech connections per hour could be set up via another such subscriber line, i.e. the group processor performance required per terminal (port) can fluctuate by more than three orders of magnitude.

SUMMARY OF THE INVENTION

An object of the invention is to obtain an optimum control or switching capacity of a switching system, even given changing traffic characteristics in the line circuit area.

According to the invention, a plurality of line module means are provided for connection of subscriber lines to the switching network. A plurality of trunk module means are provided for connection of trunk lines to the switching network. A plurality of group processor means are connected to the switching network structurally independently of the line module means and trunk module means. At least one line module means or trunk module means being respectively allocated to one group processor means. Coordination processor means are connected to the switching network for making the allocation variable during operation of the switching system.

As a result of the flexible allocation of the line/trunk groups during operation of the switching system, it is possible to add new group processors without disturbing the ongoing operation of the exchange given a deviation of the need for control capacity anticipated when planning an exchange from the control capacity actually required. For the same reason, only the current need for control capacity need be taken into consideration when planning an exchange, i.e. only as many group processors need be employed as are required at the time the exchange is placed into operation.

A further advantage of the invention is that a uniform load distribution between the group processors can be achieved, even given changing traffic characteristics.

A further advantage of the invention is that a group processor that runs non-redundantly in case of malfunction can either be replaced by a reserve group processor, or the intact group processors can assume the control load and the data thereof from the group processor running non-redundantly.

The switching system of the invention has the particular advantage that no separate switching network is required for the communications relationship between the interfacing processor of a line or trunk module and the group processor allocated to this line or trunk module.

The switching system of the invention has the particular advantage that the allocation can be realized in an especially simple way by the operator of the switching system of the MML commands.

The switching system of the invention has the particular advantage that the operator of the switching system is relieved and a faster adaptation of the switching system is achieved in the line circuit area, given changing traffic characteristics.

DESCRIPTION OF THE PREFERRED EMBODIMENTS

Figure 1:
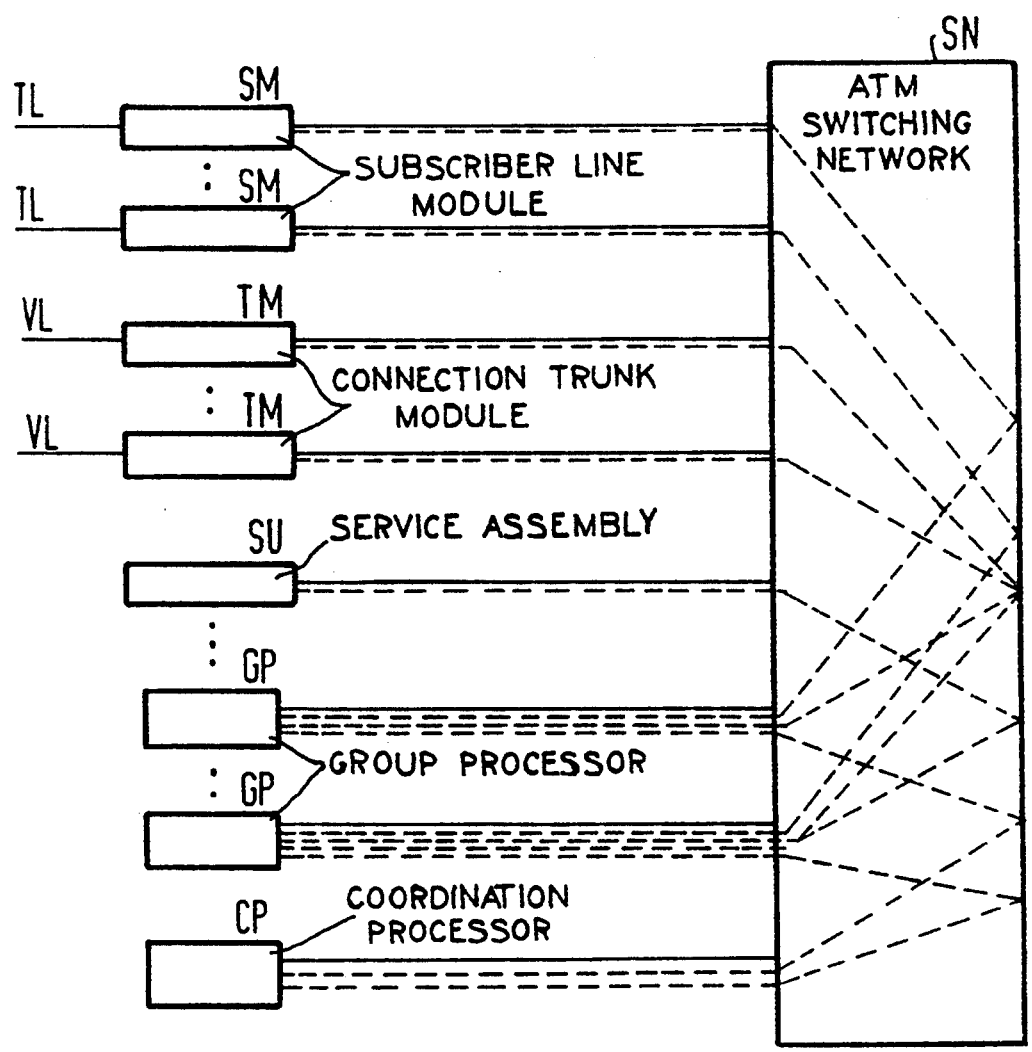
FIG. 1 shows a broad band switching system having a variable allocation feature according to the invention.

The drawing Figure shows a specific ATM switching system of the invention that comprises an ATM switching network SN, subscriber line modules SM for connecting subscriber lines TL, connection trunk modules TM for connecting trunk lines VL, service assemblies SU for offering special equipment (for example, conference circuits), group processors GP, as well as a coordination processor CP.

The ATM switching network is a matter of a self-controlling switching network wherein every ATM cell to be switched contains a connection number (identification of the virtual connection) in what is referred to as its header, and contains an address of the switching network output to which it is switched.

The line and trunk modules SM and TM, service assemblies, group processors and coordination processors are connected to the switching network individually or in groups, for example via a multiplexer, but structurally independently of one another. The allocation of a plurality of line or trunk modules or service assemblies to a group processor occurs on the basis of the administrative software in the coordination processor, and can be modified as needed during the operation of the switching system (for example, changes in the traffic characteristics of a line or trunk module).

The allocation occurs in that a respective virtual connection is connected by the group processor to all line or trunk modules it is to control and the data (type of connection, subscriber authorizations, etc.) allocated to the line or trunk modules are loaded into the group processor by the coordination processor. Furthermore, every group processor creates transient data per connection (for example, free/busy statuses).

The communication between group processor and allocated interfacing processors needed for the implementation of the allocation (for example, for setting instructions or diagnosis) in the line or trunk modules occurs via the virtual connections on the basis of the same switching network that also switches the useful connections. The virtual connections are illustrated by broken lines in the Figure.

The design given a change of the allocation of line or trunk modules or service assemblies to a group processor shall be set forth in greater detail below.

Figure 2:
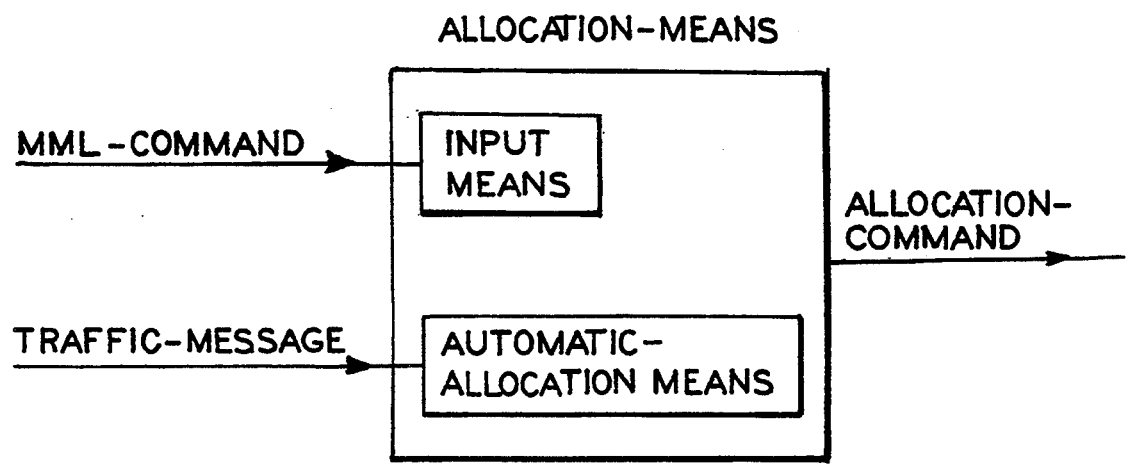
FIG. 2 shows a block diagram illustrating allocation within the coordination processor.

First, as shown in the block diagram of FIG. 2, the coordination processor is informed either by a MML command of the operator or by its own administrative software that a change of the allocation of line or trunk modules to a first group processor is necessary because of changed traffic characteristics in the line circuit area, for example because the switching capacity of the first group processor is no longer adequate for the increased connection rate in its control area. Subsequently, a second group processor is selected which, due to its low workload, is in the position to assume the control of specific line or trunk modules that were hitherto controlled by the first group processor.

The actual transfer of the control can be implemented in a simple way by accepting a loss of existing connections or can be initiated in a more complicated way without existing connections. In the former instance, the line or trunk modules that are affected are first placed out of operation by the first group processor in the usual way in order to then be placed back into operation by the second group processor. In the second case, a transfer of all transient and semi-permanent data of the affected line or trunk modules from the first group processor to the second group processor must occur before the actual transfer of the control. In the former instance, the change in allocation must occur at times of a generally low traffic volume so that optimally few connections have to be cleared down.

As mentioned, and as shown in FIG. 2, the allocation of the line or trunk modules to the group processors is based on the traffic characteristics in the line circuit area of the subscriber lines and trunk lines.

In the simplest case, for example, the traffic characteristic of a line or trunk module can be identified by counting the number of call setups per time unit or—in more complicated but more exact fashion—can be defined by measuring the processor time required per line or trunk module and time unit. The latter method thus takes different types of subscribers into consideration (analog subscribers, ISDN subscribers) as well as different subscriber performance features (abbreviated dial codes, call redirection, etc.).

The requirement of switching capacity per line or trunk module is identified with reference to the traffic characteristics, and is utilized as a criterion for the optimum allocation of the line or trunk modules to the group processors (optimum load distribution between the group processors).

As a result of the described, flexible allocation of the line or trunk modules to the group processors and of the structural separation between group processors and line or trunk modules, it is also possible to correspondingly increase the switching capacity of the entire switching system by adding further group processors during operation of the switching system.

Every group processor GP is usually redundant, i.e. is present as a redundant system, so that no data and no connections are lost given outage of a single processor. In order to reduce the risk of a total outage of such a redundant system, for example, a group processor that is operating non-redundantly can be replaced by a reserve redundant system. Another possibility is that the intact redundant systems assume equal parts of the load (line or trunk modules, service assemblies) and the corresponding data from the non-redundant group processor.

Although various minor changes and modifications might be proposed by those skilled in the art, it will be understood that I wish to include within the claims of the patent warranted hereon all such changes and modifications as reasonably come within my contribution to the art.

I claim as my invention:

1. A switching system, comprising:
   a switching network;
   a plurality of line module means for connection of subscriber lines to the switching network;
   a plurality of trunk module means for connection of trunk lines to the switching network;
   a plurality of group processor means for controlling the line module means and the trunk module means, said group processor means being connected to the switching network structurally independently of the line module means and trunk module means; and
   coordination processor means for allocating at least one line module means or trunk module means to one group processor means and for changing the allocation of at least one of said line module means or trunk module means to another one of the group processor means during operation of the switching system.

2. A switching system according to claim 1 wherein said coordination processor means has an operator input means for permitting an operator to initiate said changing of the allocation of said at least one line module means or trunk module means.

3. A switching system according to claim 1 wherein said coordination processor means for making the allocation changeable includes means for making the allocation automatically changeable depending on traffic characteristics of the line module means or trunk module means.

4. A switching system, comprising:
   a switching network;
   a plurality of line module means for connection of subscriber lines to the switching network;
   a plurality of trunk module means for connection of trunk lines to the switching network;
   at least first and second group processor means for control of the line module means and the trunk module means, said first and second group processor means being connected to the switching network; and
   coordination processor means for allocating at least one line module means or trunk module means to the first group processor means and for changing the allocation during operation of the switching system so that a second group processor means assumes control of specific line or trunk modules that were previously controlled by the first group processor means.

5. A switching system, comprising:
   a switching network;
   a plurality of line module means for connection of subscriber lines to the switching network;
   a plurality of trunk module means for connection of trunk lines to the switching network;
   a plurality of group processor means for controlling the line module means and the trunk module means, said plurality of group processor means being connected to the switching network and not being directly connected to the line module means and the trunk module means so that each of the plurality of group processor means controls the line module means and the trunk module means through the switching network; and coordination processor means for allocating at least one of the plurality of line module means or at least one of the plurality of trunk module means to one of the plurality of group processor means and for varying the allocation during operation of the switching system so that the allocation of the at least one line module means or the at least one trunk module means to the one group processor means can be changed.

* * * * *